US009831531B2

(12) United States Patent
Tsukui (10) Patent No.: US 9,831,531 B2
(45) Date of Patent: Nov. 28, 2017

(54) METHOD OF MANUFACTURING BATTERY (75) Inventor: Akira Tsukui, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 314 days.

(21) Appl. No.: 14/413,576

(22) PCT Filed: Jul. 9, 2012

(86) PCT No.: PCT/JP2012/067522
§ 371 (c)(1),
(2), (4) Date: Jan. 8, 2015

(87) PCT Pub. No.: WO2014/010024
PCT Pub. Date: Jan. 16, 2014

(65) Prior Publication Data
US 2015/0207182 A1    Jul. 23, 2015

(51) Int. Cl.
*H01M 2/08* (2006.01)
*H01M 10/48* (2006.01)
*H01M 2/36* (2006.01)
*H01M 10/42* (2006.01)
*H01M 10/04* (2006.01)
*H01M 10/058* (2010.01)
*H01M 10/052* (2010.01)

(52) U.S. Cl.
CPC ......... *H01M 10/4228* (2013.01); *H01M 2/36* (2013.01); *H01M 2/365* (2013.01); *H01M 10/0431* (2013.01); *H01M 10/052* (2013.01); *H01M 10/058* (2013.01); *Y10T 29/49004* (2015.01); *Y10T 29/4911* (2015.01)

(58) Field of Classification Search
CPC ............. H01M 10/48; H01M 10/4228; H01M 10/4214; H01M 2/36
See application file for complete search history.

(56) References Cited

U.S. PATENT DOCUMENTS

| 6,485,862 B1 | 11/2002 | Yoshioka et al. |
| 6,593,026 B1 | 7/2003 | Tukawaki et al. |
| 2003/0035993 A1 | 2/2003 | Enomoto et al. |
| 2003/0207169 A1* | 11/2003 | Tukawaki ............... H01M 2/36 429/90 |

FOREIGN PATENT DOCUMENTS

| CN | 1350336 A | 5/2002 |
| JP | 2002117901 A | 4/2002 |

(Continued)

OTHER PUBLICATIONS

International Search Report for PCT/JP2012/067522 dated Oct. 9, 2012 [PCT/ISA/210].

*Primary Examiner* — Patrick Ryan
*Assistant Examiner* — Julian Anthony
(74) *Attorney, Agent, or Firm* — Sughrue Mion, PLLC (57) ABSTRACT A method of manufacturing a battery proposed herein includes the following steps A to D. Step A is the step of preparing a battery case in which an electrode assembly is enclosed. Step B is the step of depressurizing an interior of the battery case prepared in step A. Step C is the step of filling an electrolyte solution and a leakage testing gas into the battery case depressurized in step B. Step D is the step of sealing the battery case containing the electrolyte solution and the leakage testing gas filled in step C.

18 Claims, 7 Drawing Sheets

(56) References Cited

FOREIGN PATENT DOCUMENTS

| | | |
|---|---|---|
| JP | 2004-22502 A | 1/2004 |
| JP | 2007-165170 A | 6/2007 |
| JP | 2009-26569 A | 2/2009 |
| JP | 2010-56000 A | 3/2010 |
| JP | 2010-244898 A | 10/2010 |
| JP | 2010-251089 A | 11/2010 |
| WO | 00/41263 A1 | 7/2000 |
| WO | 01/59856 A1 | 8/2001 |

* cited by examiner

METHOD OF MANUFACTURING BATTERY

CROSS REFERENCE TO RELATED APPLICATIONS

This application is a National Stage of International Application No. PCT/JP2012/067522, filed on Jul. 9, 2012, the contents of all of which are incorporated herein by reference in their entirety.

TECHNICAL FIELD

The present invention relates to a method of manufacturing a battery.

BACKGROUND ART

An example of a battery manufacturing method is disclosed in JP 2009-026569 A, in which a sealed-type battery is fabricated in a hermetically sealed container with a leakage testing gas atmosphere. According to the publication, this allows the interior of the battery case to be substantially a leakage testing gas atmosphere, improving the accuracy of hermeticity test for a sealed-type battery.

JP 2010-244898 A discloses the procedure of enclosing battery components, such as a wound assembly and current collectors, into a battery case (i.e., casing), performing a leakage test (hermeticity test), forming a safety vent in a lid, filling an electrolyte solution, and sealing a filling port with a sealing member. Here, the hermeticity test is carried out prior to the step of filling an electrolyte solution. The publication also discloses a technique of leakage test in which helium gas is pumped through the filling port and leakage is checked by determining whether or not the helium gas is detected in the vicinity of the battery case.

CITATION LIST

Patent Literature

[Patent Literature 1] JP 2009-026569 A
[Patent Literature 2] JP 2010-244898 A

SUMMARY OF INVENTION

Technical Problem

In a leakage testing method, a leakage testing gas (e.g., helium gas) is sealed in a battery case. In this case, it is desirable to simplify the process of filling the leakage testing gas into the battery case. In addition, in order to improve the accuracy of the leakage test, it is desirable to increase the concentration of the leakage testing gas sealed in the battery case. In view of such circumstances, the present inventor proposes a novel battery manufacturing method and a battery leakage testing method.

Solution to Problem

A method of manufacturing a battery proposed herein includes the following steps A through D. Step A is the step of preparing a battery case in which an electrode assembly is enclosed. Step B is the step of depressurizing an interior of the battery case prepared in step A. Step C is the step of filling an electrolyte solution and a leakage testing gas into the battery case depressurized in step B. Step D is the step of sealing the battery case containing the electrolyte solution and the leakage testing gas filled in step C. Such a method of manufacturing a battery makes it possible to provide a battery in which the concentration of the leakage testing gas Gr is high in the battery case. The method includes step C of filling an electrolyte solution and a leakage testing gas into the battery case depressurized in the step B, and does not require an additional step of filling the leakage testing gas Gr alone into the battery case. Therefore, the manufacturing process can be simplified.

In this case, in step C, the electrolyte solution may be filled into the battery case having been depressurized in step B while an atmosphere of the leakage testing gas is provided outside the battery case. In addition, step A may further include the step of drying the battery case in which the electrode assembly is enclosed. In this case, the moisture contained in the battery can be reduced, and generation of hydrogen gas can be inhibited. In addition, at least the step B through the step C may be performed while the battery case is placed in a hermetic container having hermeticity.

It is also possible that step B may further include the step of depressurizing the interior of the hermetic container by placing a pot containing an electrolyte solution so as to allow a filling port of the battery case to communicate with the pot and opening the pot above a surface level of the electrolyte solution, and in step C, the interior of the hermetic container may be filled with the leakage testing gas atmosphere. In this case, in particular, the electrolyte solution may be, for example, a non-aqueous electrolyte solution.

The method may also include, after step A and before step B, the step of depressurizing the interior of the battery case prepared in step A to fill the leakage testing gas in the depressurized battery case. Here, in the step of depressurizing the interior of the battery case prepared in step A, the interior of the battery case may be depressurized to a pressure lower than the vapor pressure of the electrolyte solution. In addition, in step C, and prior to step D, the leakage testing gas may be pressurized to fill the leakage testing gas into the battery case.

The method may also include, after step C and before step D, the step of refilling the leakage testing gas by depressurizing the interior of the battery case and filling the leakage testing gas into the depressurized battery case. In addition, in the step of refilling, the leakage testing gas may be pressurized to fill the leakage testing gas into the battery case.

It is also possible that the leakage testing gas may be a helium gas. The above-described method of manufacturing a battery may further include step E of checking whether or not the leakage testing gas leaks out of the battery case sealed in the step D.

With the method of manufacturing a battery proposed herein, it is possible to construct a battery including a battery case, an electrode assembly enclosed in the battery case, and a non-aqueous electrolyte solution filled in the battery case. In this case, it is possible to manufacture a battery in which the battery case contains a gas atmosphere including a leakage testing gas in an amount of 5% or greater (volume percentage) and a hydrogen gas in an amount of 0.1% or greater (volume percentage). In other words, with the method of manufacturing a battery proposed herein, the moisture content contained in the battery case is low. Therefore, it is possible to manufacture a battery in which the concentration of the leakage testing gas is high and the concentration of hydrogen gas is low in the gas atmosphere in the battery case.

DESCRIPTION OF EMBODIMENTS

Hereinbelow, a method of manufacturing a battery and a method of testing battery leakage according to one embodiment of the present invention will be described with reference to the drawings. It should be noted that the drawings are depicted schematically and do not necessarily reflect actual objects. The drawings merely show examples, and they do not limit the invention unless otherwise stated. The parts and components that exhibit the same workings are denoted by the same reference symbols as appropriate.

Figure 1:
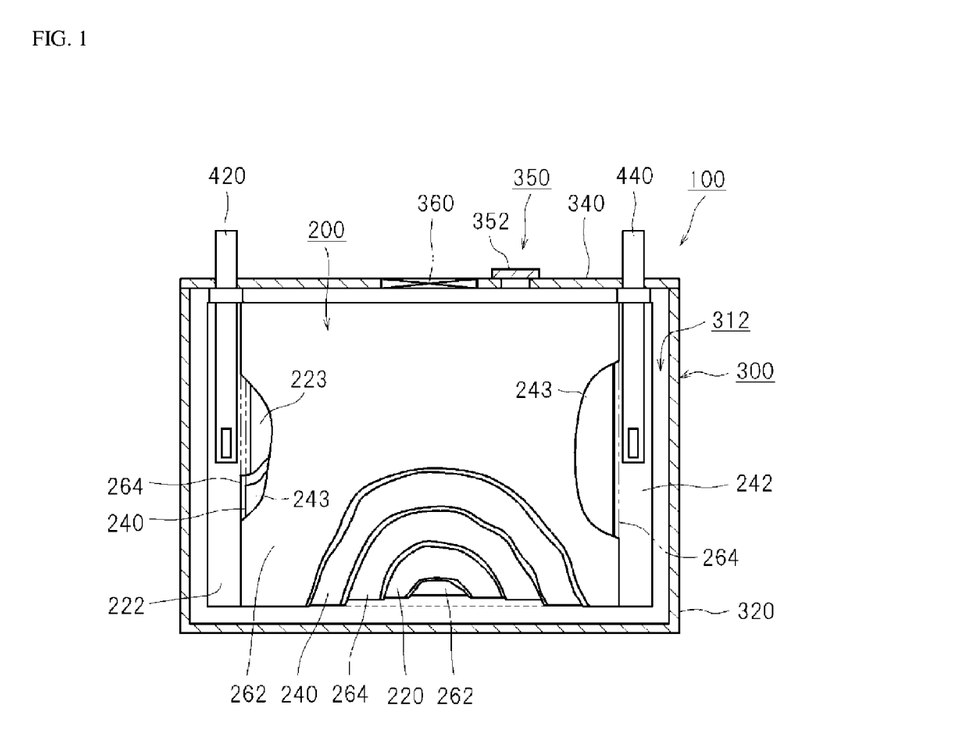
FIG. 1 is a view illustrating an example of the structure of a battery.

FIG. 1 illustrates an example of the structure of a battery to which the battery manufacturing method and the battery leakage testing method can be applied.

<<Battery 100>>

As illustrated in FIG. 1, a battery 100 includes an electrode assembly 200 and a battery case 300. In this embodiment, the electrode assembly 200 is a wound electrode assembly. The wound electrode assembly 200 has a positive electrode sheet 220, a negative electrode sheet 240, and separators 262 and 264.

<<Positive Electrode Sheet 220>>

The positive electrode sheet 220 has a strip-shaped conductive sheet (for example, a metal foil) and a positive electrode active material layer 223 retained on the conductive sheet. In this embodiment, the positive electrode active material layer 223 is retained on both faces of the strip-shaped conductive sheet except for a predetermined region (uncoated portion 222) in one lateral-side edge of the strip-shaped conductive sheet. The positive electrode active material layer 223 contains a positive electrode active material.

<<Negative Electrode Sheet 240>>

The negative electrode sheet 240 has a strip-shaped conductive sheet (for example, a metal foil) and a positive electrode active material layer 243 retained on the conductive sheet. In this embodiment, the negative electrode active material layer 243 is retained on both faces of the strip-shaped conductive sheet except for a predetermined region (uncoated portion 242) in one lateral-side edge of the strip-shaped conductive sheet.

The positive electrode sheet 220 and the negative electrode sheet 240 are aligned in the same longitudinal direction so that the respective uncoated portions 222 and 242 protrude in laterally opposite directions, and they are stacked with the separators 262 and 264 being interposed between the positive electrode active material layer 223 and the negative electrode active material layer 243. The positive electrode sheet 220, the negative electrode sheet 240, and the separators 262 and 264 that are stacked in this manner are wound together around a winding axis that is set along a lateral direction of the positive electrode sheet 220.

<<Battery Case 300>>

In this embodiment, the battery case 300 has a case main body 320 and a lid 340. The case main body 320 has a rectangular shape the upper face of which has an opening. The lid 340 is an oblong plate-shaped member corresponding to the opening in the upper face of the case main body 320. A safety vent 360 is fitted to a central portion of the lid 340. A filling port 350 is formed beside the safety vent 360. Moreover, electrode terminals 420 and 440 are attached at opposite side portions. The electrode terminals 420 and 440 penetrate through the lid 340 while they are insulated therefrom, and are fixed to the lid 340.

In the wound electrode assembly 200, the uncoated portion 222 of the positive electrode sheet 220 is attached to the electrode terminal 420 of the positive electrode, and the uncoated portion 242 of the negative electrode sheet 240 is attached to the electrode terminal 440 of the negative electrode. The wound electrode assembly 200 is enclosed in the battery case 300 in such a manner that it is deformed into a flat shape. It should be noted that in the example shown in the drawings, the filling port 350 is depicted to be larger than the actual one. In this embodiment, the filling port 350 is a small hole having a diameter of about 1.6 mm, which penetrates through the lid 340. The safety vent 360 is opened when the pressure inside the battery case 300 becomes higher than a predetermined pressure, and it is provided in a closed state in the lid 340.

In the following, a battery manufacturing method will be described with emphasis on a battery leakage test.

The battery manufacturing method includes a battery case preparing step (step A), a depressurizing step (step B) (see FIG. 3), a step of filling an electrolyte solution and a leakage testing gas into the battery case (step C) (see FIG. 4), and a sealing step (step D).

<<Battery Case Preparing Step>>

A battery case preparing step (step A) is the step of preparing the battery case 300 in which the electrode assembly 200 is enclosed. The battery case 300 prepared here is such that, for example, the electrode assembly 200 is disposed at a predetermined position in the battery case 300 and the lid 340 is closed, as illustrated in FIG. 1. Also, substantially no electrolyte solution is filled in the battery case 300 at this stage. In other words, the battery 100 in which the filling port 350 is open and the electrolyte solution 354 is not yet filled therein is prepared here.

<<Cell Drying Step>>

Figure 2:
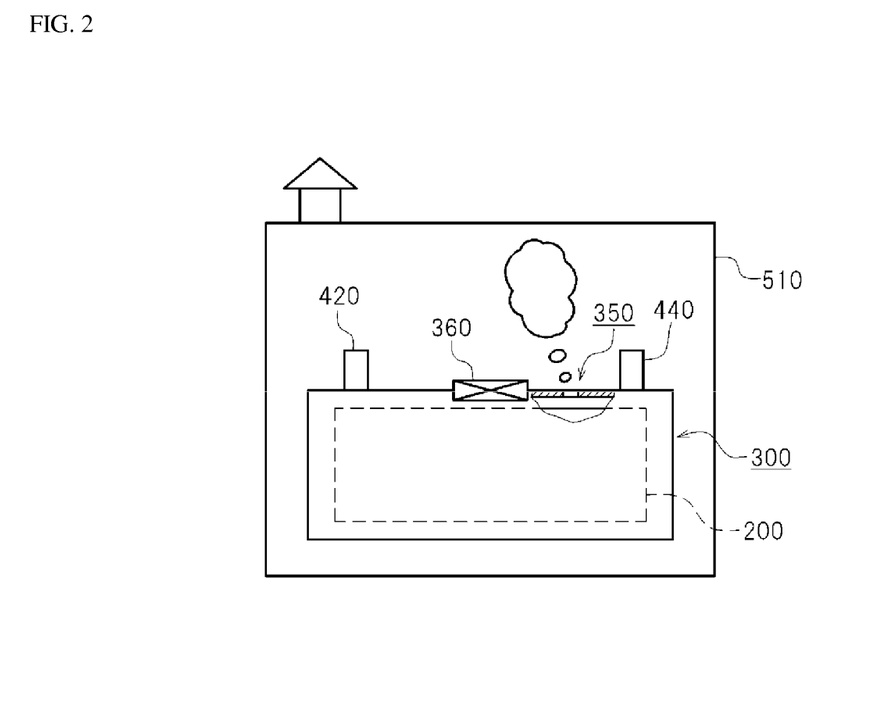
FIG. 2 is a view illustrating an example of a cell drying step.

In this embodiment, the battery case preparing step (step A) includes the step of drying the battery case 300 in which the electrode assembly 200 is enclosed (i.e., cell drying step). FIG. 2 is a view illustrating an example of the cell drying step. In the cell drying step, for example, the battery case 300 in which the electrode assembly 200 is enclosed is placed in a drying oven 510 controlled to have a dry atmosphere, as illustrated in FIG. 2. In this case, the filling port 350 of the battery case 300 is open. The moisture in the battery case 300 is allowed to be discharged out of the battery case 300 through the filling port 350. At that time, the moisture remaining in the wound electrode assembly 200 also can be discharged out of the battery case 300.

In the cell drying step, it is desirable that the battery case 300 in which the electrode assembly 200 is enclosed should be set aside, for example, for 2 hours or longer in a drying oven in which the temperature is adjusted to be from 90° C. to 110° C. and the dew point is adjusted to be 60° or lower. Appropriate conditions of the cell drying step may be determined as appropriate depending on, for example, the size and the structure of the cell, or to what degree the cell should be dried.

<<Depressurizing Step>>

Figure 3:
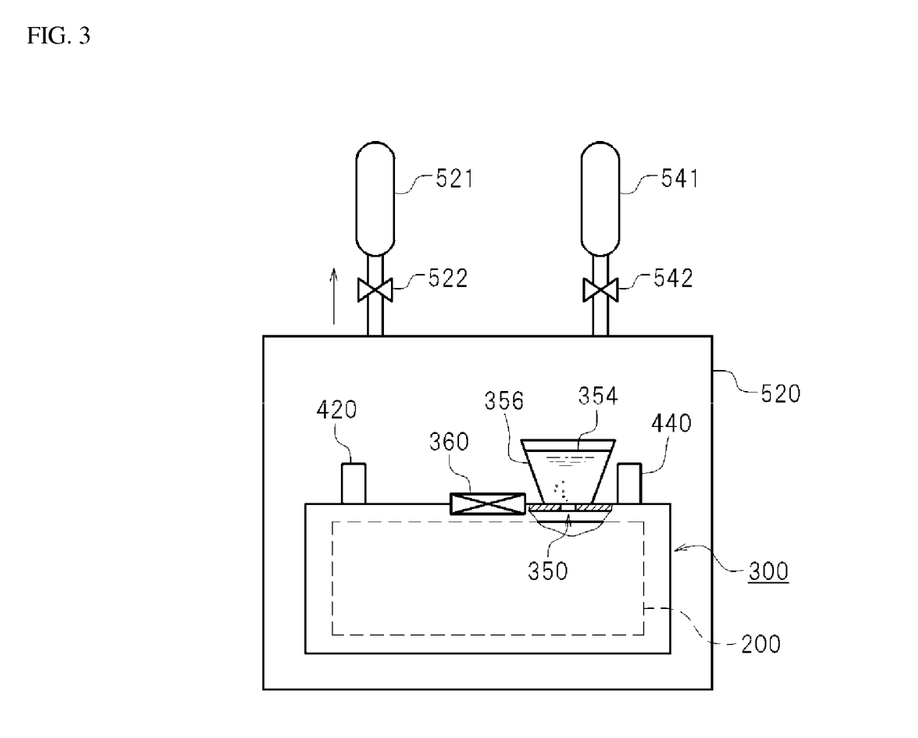
FIG. 3 is a view illustrating an example of the depressurizing step (step B).

In the depressurizing step (step B), the interior of the battery case 300 prepared in the battery case preparing step (step A) is depressurized. Herein, the term "depressurized" is, for example, used relative to the atmospheric pressure, and it means that the interior of the battery case 300 is brought to a pressure lower than the atmospheric pressure. FIG. 3 is a view illustrating an example of such a depressurizing step (step B). For example, a hermetic container 520, which is connected to a vacuum pump 521 and a tank 541 containing a leakage testing gas GR via respective open-close valves 522 and 542, is prepared, as illustrated in FIG. 3. The hermetic container 520 may be provided with a sensor 530 for sensing the leakage testing gas Gr.

The battery case 300 is placed in such a hermetic container 520 having hermeticity. In the depressurizing step (step B), the open-close valve 522 is opened while the open-close valve 542 is closed, and the hermetic container 520 is connected to the vacuum pump 521 to depressurize (evacuate) the hermetic container 520. At that time, the interior of the battery case 300 disposed in the hermetic container 520 is also depressurized through the filling port 350. This allows the air and the water remaining in the battery case 300 to be discharged therefrom.

The degree of depressurization in such a step B should be controlled so that, for example, the pressure can be −30 kPa or lower, preferably −50 kPa or lower, more preferably −60 kPa or lower, and still more preferably −70 kPa or lower, relative to the atmospheric pressure. This makes it possible to produce a pressure difference between the inside of the battery case 300 and the outside of the battery case 300 that is sufficient to draw the electrolyte solution 354 into the battery case 300 in a later-described filling step (step C). Moreover, this allows the air and the moisture in the battery case 300 to be substantially discharged therefrom.

The greater the degree of depressurization becomes (i.e., the lower the pressure of the interior of the battery case 300 becomes), the more the air and the moisture in the battery case 300 can be discharged. In addition, in this embodiment, the hermetic container 520 that is depressurized in the depressurizing step contains a non-aqueous electrolyte solution. In this case, it is desirable that the interior of the hermetic container 520 be depressurized to such a level that the non-aqueous electrolyte solution will not be boiled. For example, when the non-aqueous electrolyte solution boils at about −93 kPa relative to the atmospheric pressure, it is desirable that the interior of the hermetic container 520 be depressurized to be from about −70 kPa to about −90 kPa (to such a level that the non-aqueous electrolyte solution will not be boiled) in the depressurizing step (step B). For example, it is desirable that the interior of the hermetic container 520 be depressurized to a pressure from about 2 kPa to about 5 kPa (preferably 3 kPa) higher than the vapor pressure at which the non-aqueous electrolyte solution boils.

In this embodiment, as illustrated in FIG. 3, a pot 356 containing a predetermined amount of electrolyte solution 354 is allowed to communicate with the filling port 350 of the battery case 300 in the hermetic container 520. The pot 356 is opened above the surface level of the electrolyte solution 354. In this embodiment, the pot 356 has an opening in an upper space above the surface level of the electrolyte solution 354 (for example, in the top face of the pot 356 or in an upper side face of the pot 356) so as to be opened in the hermetic container 520. A rubber ring as a sealing member is fitted so as to surround the filling port 350. A spout in a lower portion of the pot 356 is pressed against the ring-shaped sealing member (not shown) and allowed to communicate with the filling port 350 of the battery case 300 so as not to cause leakage.

As illustrated in FIG. 3, in this embodiment, the electrolyte solution 354 is placed in the pot 356, the spout of which is pressed against the filling port 350 of the battery case 300. The filling port 350 is a small hole having a diameter of about 1.6 mm. Moreover, the rubber ring is fitted to the filling port 350, and the spout of the pot 356 is pressed against the rubber ring. Therefore, the filling port 350 results in a smaller hole than the actual opening size.

In this embodiment, the electrolyte solution 354 is a non-aqueous electrolyte solution. For example, it is possible to use an electrolyte solution in which $LiPF_6$ is contained at a concentration of about 1 mol/L in a mixed solvent of ethylene carbonate and diethyl carbonate (e.g., a mixed solvent with a volume ratio of about 1:1), such as used for lithium-ion secondary batteries. The electrolyte solution 354 is not limited to this example, but various types of non-aqueous electrolyte solution may be used.

Such a non-aqueous electrolyte solution has extremely higher surface tension than water. However, the filling port 350 is sufficiently small, as described above. Therefore, due to the surface tension, almost the entire amount of electrolyte solution 354 does not drip into the battery case 300 through the filling port 350 but remains in the pot 356.

In this embodiment, the interior of the hermetic container 520 is depressurized while the pot 356 containing the electrolyte solution 354 is allowed to communicate with the filling port 350 of the battery case 300. When the interior of the hermetic container 520 is depressurized, the air in the battery case 300 is discharged through the filling port 350. At that time, the air in the battery case 300 is turned into air bubbles in the electrolyte solution 354 within the pot 356 and discharged into the hermetic container 520.

Thus, in this embodiment, it is desirable that the filling port 350 have such a size that the air in the battery case 300 can be discharged and also substantially the entire amount of the electrolyte solution 354 does not drip in the pot 356 but remains in the battery case 300 in the depressurizing step (step B).

The interior of the battery case 300 is depressurized through such a depressurizing step. In the depressurizing step, the pressure in the battery case 300 is lowered. As a result, a portion of the moisture remaining in the battery case 300 is turned into water vapor and is discharged therefrom. Thus, the depressurizing step also serves to discharge the moisture remaining in the battery case 300.

In this embodiment, the battery case preparing step (step A) includes the step of drying the battery case 300 in which the electrode assembly 200 is enclosed (i.e., cell drying step). In the cell drying step, the battery case 300 not yet filled with the electrolyte solution is dried. This means that the amount of moisture remaining in the battery case 300 is negligible before the depressurizing step. Moreover, in the depressurizing step, the interior of the battery case 300 is depressurized to a pressure sufficiently lower than the vapor pressure. As a result, a portion of the moisture remaining in the battery case 300 after the cell drying step is vaporized inside the battery case 300, turned into water vapor, and discharged together with the air in the depressurizing step. Thus, in this embodiment, the battery case 300 in which the electrode assembly 200 is enclosed is dried before the depressurizing step by the cell drying step. Therefore, the interior of the battery case 300 contains an extremely low content of moisture after the depressurizing step.

As described above, the depressurizing step also serves to discharge the moisture within the battery case 300. Even if the above-described cell drying step is not provided, the depressurizing step can bring the battery case 300 to such a condition that the battery case 300 contains almost no moisture. The moisture in the battery case 300 can be removed more reliably by performing the cell drying step before the depressurizing step to remove the moisture in the battery case 300.

In the depressurizing step, it is possible that the moisture remaining in the battery case 300 may be turned into water vapor and dissolved into the electrolyte solution while passing through the electrolyte solution. When such an event is taken into consideration, it is desirable that the cell drying step be performed to remove the moisture in the battery case 300 before the depressurizing step. As described above, almost the entire moisture in the battery case 300 is removed before the depressurizing step by performing the cell drying step before the depressurizing step. In this case, the amount of the moisture that is dissolved in the electrolyte solution when passing through the electrolyte solution during the depressurizing step becomes negligible. Thus, by conducting the cell drying step before the depressurizing step, it is possible to manufacture a battery in which the amount of moisture contained in the battery case 300 is remarkably low.

In this embodiment, in the depressurizing step (step B), when the interior of the battery case 300 (i.e., the interior of the hermetic container 520) is in a predetermined negative pressure condition, the open-close valve 522 of the vacuum pump 521 is closed. In addition, in this embodiment, the electrolyte solution 354 exists in the hermetic container 520 in the depressurizing step (step B), as illustrated in FIG. 3. For this reason, it is desirable that the level of depressurization by the vacuum pump 521 be set to a level such that the electrolyte solution 354 does not evaporate, and be set to a pressure higher than the vapor pressure of the electrolyte solution 354 at a temperature at the time of the depressurization.

In this embodiment, the electrolyte solution 354 is a non-aqueous electrolyte solution. For example, when using an electrolyte solution in which $LiPF_6$ is contained at a concentration of about 1 mol/L in a mixed solvent of ethylene carbonate and diethyl carbonate (e.g., a mixed solvent with a volume ratio of about 1:1), such as used for lithium-ion secondary batteries, the electrolyte solution can boil at −93 kPa relative to the atmospheric pressure in a temperature environment of about 20° C. Accordingly, in the depressurizing step (step B), the interior of the battery case can be depressurized to about −70 kPa or lower, more preferably to about −90 kPa (i.e., such a pressure at which the electrolyte solution does not boil), relative to the atmospheric pressure.

<<Step of Filling Electrolyte Solution 354 and Leakage Testing Gas Gr into Battery Case 300>>

Figure 4:
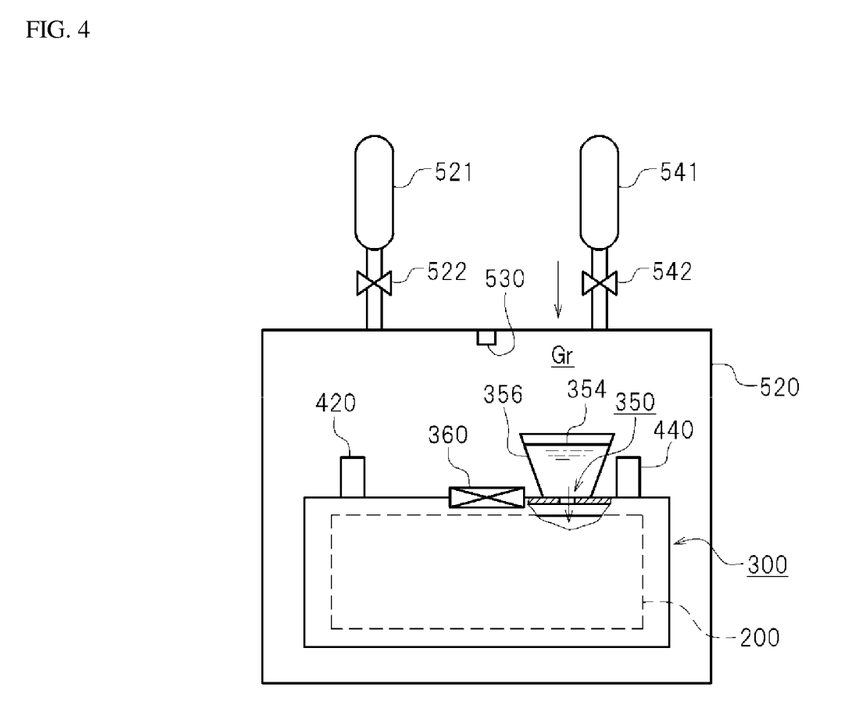
FIG. 4 is a view illustrating an example of step C.

Next, the step of filling the electrolyte solution 354 and the leakage testing gas Gr into the battery case 300 will be described. FIG. 4 is a view illustrating an example of such step C. As illustrated in FIG. 4, in such step C, the leakage testing gas Gr is introduced into the battery case 300 when the electrolyte solution 354 is filled in the battery case 300.

In such step C, it is desirable that the electrolyte solution 354 be filled into the battery case 300 depressurized in step B while an atmosphere of the leakage testing gas Gr is provided outside the battery case 300. Thereby, the leakage testing gas Gr comes into the battery case 300 when the electrolyte solution 354 is filled into the battery case 300.

For example, in this embodiment, the battery case 300 is disposed in the hermetic container 520 in the depressurizing step (step B). Here, in the hermetic container 520, the pot 356 containing the electrolyte solution 354 is allowed to communicate with the filling port 350 of the battery case 300. Because of the surface tension, the electrolyte solution 354 does not drip into the battery case 300 through the filling port 350 but remains in the pot 356. The interiors of the hermetic container 520 and the battery case 300 are depressurized. In other words, the space in the battery case 300 and the space in the hermetic container 520, which are both depressurized, are separated by the electrolyte solution 354 contained in the pot 356.

Under this condition, in step C, the leakage testing gas Gr is introduced into the hermetic container 520, so that the interior of the hermetic container 520 is filled with the leakage testing gas atmosphere. Specifically, as illustrated in FIG. 3, the leakage testing gas Gr in the tank 541 is introduced into the hermetic container 520 by closing the open-close valve 522 of the vacuum pump 521 and opening the open-close valve 542 of the tank 541 containing the leakage testing gas Gr. As a result, the interior of the hermetic container 520 is filled with the atmosphere of the leakage testing gas Gr. In this embodiment, the pressure of the atmosphere of the leakage testing gas Gr in the hermetic container 520 is brought to approximately the same level as the atmospheric pressure.

At that time, when the pressure of the atmosphere of the leakage testing gas Gr in the hermetic container 520 increases, a pressure difference arises between the interior of the hermetic container 520 (i.e., the outside of the battery case 300) and the interior of the battery case 300. As the pressure difference between the interior of the hermetic container 520 (i.e., the outside of the battery case 300) and the interior of the battery case 300 becomes large to a certain level, the electrolyte solution 354 cannot be retained in the pot 356. Therefore, when the leakage testing gas Gr is introduced into the hermetic container 520, the electrolyte solution 354 in the pot 356 instantaneously flows into the battery case 300 through the filling port 350. When the electrolyte solution 354 in the pot 356 flows into the battery case 300, the space in the battery case 300 and the space in the hermetic container 520 (outside the battery case 300) are connected via the filling port 350. As a result, the leakage testing gas Gr in the hermetic container 520 flows into the battery case 300. Thus, in this embodiment, the electrolyte solution 354 in the pot 356 is filled into the battery case 300 in step C. For this reason, it is desirable that the electrolyte solution 354 be placed in advance in the pot 356 in an amount that is to be filled into the battery case 300.

<<Leakage Testing Gas Gr>>

In this embodiment, a commercially available helium gas (99.9% (volume ratio)) is used as the leakage testing gas Gr. For the leakage testing gas Gr, it is also possible to use hydrogen, halogen, Freon, or the like, other than the helium gas.

Among these, the helium gas is safe because it is non-flammable and causes no significant adverse effects on human bodies or environment. In addition, because the helium gas has a small molecular diameter and a small mass, the helium gas can leak outside easily if the battery case 300 has very small holes. Furthermore, the helium gas exists only in a very small amount in the normal atmosphere and in metals. For this reason, when the helium gas is detected in the leakage test, it can be easily determined as the gas that has leaked out of the battery case 300. In addition, because the helium gas has a small molecular diameter and a small mass, the helium gas can leak outside easily if the battery case 300 has very small holes. Moreover, because the helium gas is a chemically inert gas (i.e., stable gas), the helium gas is unlikely to corrode metals. For these reasons, the helium gas is advantageous as the leakage testing gas Gr for batteries.

<<Sealing Step>>

A sealing step (step D) is the step of sealing the battery case 300 in which the electrolyte solution 354 and the leakage testing gas Gr are filled in step C. In such a sealing step, the filling port 350 of the battery case 300, in which the electrolyte solution 354 and the leakage testing gas Gr are filled in step C, is sealed.

It is desirable to perform the sealing step in such a manner that, for example, a sealing cap 352 (see FIG. 1) is fitted onto the filling port 350, and the circumferential portion of the sealing step is laser welded. The sealing may be carried out as follows. While the interior of the hermetic container 520 is kept to be the atmosphere of the leakage testing gas Gr, the sealing cap 352 is provisionally fitted to the filling port 350 while the sealing cap 352 is placed over the filling port 350. Then, the battery case 300 in which the sealing cap 352 is placed over the filling port 350 should be taken out of the hermetic container 520 and immediately set on a laser welding machine to carry out laser welding.

Alternatively, the sealing step may be carried out as follows. The battery case 300 is taken out of the hermetic container 520, and immediately thereafter, the sealing cap 352 is placed over the filling port 350. Then, the battery case 300 is set on a laser welding machine so as to weld the sealing cap 352 to the battery case 300. In this embodiment, the sealing performed in this sealing step is the final sealing for the battery case 300.

<<Leakage Testing Step (Step E)>>

Figure 5:
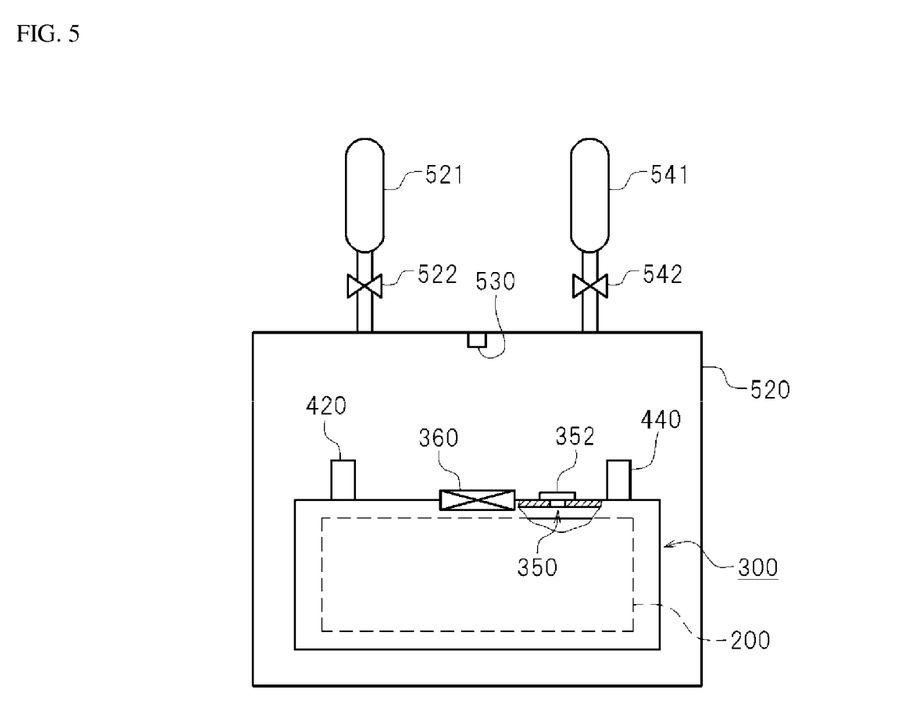
FIG. 5 is a view illustrating an example of the leakage testing step.

In this embodiment, the leakage testing gas Gr is filled in the battery case 300. Therefore, in the leakage testing step, it is desirable to check whether or not the leakage testing gas Gr leaks from the battery case 300 sealed in the above-described sealing step. FIG. 5 is a view illustrating an example of such a leakage testing step.

For the leakage testing, the battery case 300 in which the sealing cap 352 has been welded to seal the filling port 350 is used, as illustrated in FIG. 5. For example, as illustrated in FIG. 5, the battery case 300 is placed in the hermetic container 520, and the hermetic container 520 is depressurized to an appropriate level. Then, whether or not the leakage testing gas Gr is detected in the hermetic container 520 is checked using the sensor 530 fitted in the hermetic container 520. Here, when the helium gas is used as the leakage testing gas Gr, it is recommended to use a helium gas sensor, for example, as the sensor 530.

<<Battery Manufacturing Method>>

In this battery manufacturing method, the leakage testing gas Gr is filled into the battery case 300 in the step of filling the electrolyte solution 354 into the battery case 300, and the battery case 300 is sealed. This makes it possible to manufacture a battery in which the leakage testing gas Gr (for example, helium gas) is filled in the battery case 300. Then, the battery 100 that is sealed under the condition in which the leakage testing gas Gr is filled in the battery case 300 can be subjected to the leakage test for checking leakage of the leakage testing gas Gr from the battery case 300 as described above.

Also, the depressurizing step (step B) and the step of filling the electrolyte solution 354 and the leakage testing gas Gr into the battery case 300 (step B) may be performed while the battery case 300 is placed in the hermetic container 520 having hermeticity, as described previously. In this case, in the depressurizing step (step B), the battery case 300 may be enclosed in the hermetic container 520 while the pot 356 containing the electrolyte solution 354 is allowed to communicate with the filling port 350 of the battery case 300. In addition, the interior of the hermetic container 520 is depressurized while the pot 356 is allowed open above the surface level of the electrolyte solution 354. At that time, the interior of the hermetic container 520 is depressurized sufficiently, and the interior of the battery case 300 is also depressurized. Thereafter, as the step of filling the electrolyte solution 354 and the leakage testing gas Gr into the battery case 300 (step C), the interior of the hermetic container 520 is filled with the leakage testing gas Gr. Thereby, the leakage testing gas Gr as well as the electrolyte solution 354 comes into the battery case 300.

In this embodiment, the battery case 300 depressurized in the hermetic container 520 is released in the atmosphere of the leakage testing gas Gr, so that the electrolyte solution 354 is put into the battery case 300 all at once and also the leakage testing gas Gr is introduced therein. This eliminates the need of providing the step of filling the leakage testing gas Gr into the battery case 300 in addition to the step of filling the electrolyte solution 354 into the battery case 300. As a result, the production efficiency is improved. Moreover, it is unnecessary to provide equipment items separately for filling the electrolyte solution 354 and filling the leakage testing gas Gr. Therefore, the manufacturing cost can be lowered and the cost of the manufacturing equipment can be also reduced.

In addition, in order to enhance the accuracy of the leakage test, it is desirable to increase the concentration of the leakage testing gas Gr sealed in the battery case 300. The following describes techniques for increasing the concentration of the leakage testing gas Gr sealed in the battery case 300.

<<High-Concentration Filling 1: Pressure Charging>>

As a technique for sealing the leakage testing gas Gr into the battery case 300 at a high concentration, it is suggested that the concentration of the leakage testing gas Gr to be filled into the battery case 300 should be increased in the foregoing step C (the step of filling the electrolyte solution 354 and the leakage testing gas Gr into the battery case 300), for example. Specifically, in the foregoing embodiment, the pressure of the leakage testing gas Gr is set at the level of the atmospheric pressure when the leakage testing gas Gr is filled into the hermetic container 520. Here, when the leakage testing gas Gr is filled into the hermetic container 520, it is desirable to increase the pressure of the leakage testing gas Gr to a level higher than the atmospheric pressure. At that time, the pressure of the leakage testing gas Gr in the battery case 300 becomes higher according to the pressure of the leakage testing gas Gr in the hermetic container 520. Thus, the leakage testing gas Gr can be sealed in the battery case 300 at a high concentration by pressurizing and filling the leakage testing gas Gr.

For example, it is desirable that the pressure of the atmosphere of the leakage testing gas Gr in the hermetic container 520 be increased to 0.1 MPa or higher (for example, about 0.3 MPa) relative to the atmospheric pressure. When the pressure of the leakage testing gas Gr in the hermetic container 520 is increased, the leakage testing gas Gr can be sealed in the battery case 300 at a high concentration, so that the accuracy of the leakage test can be increased. On the other hand, when the pressure of the leakage testing gas Gr in the hermetic container 520 is increased excessively, the internal pressure of the battery case 300 may become high depending on the timing of sealing. For this reason, it becomes necessary to review the rigidity of the battery case 300, the sealing structure of the filling port 350, the design of the safety vent, and the like. Moreover, the equipment cost for pressurizing the atmosphere of the leakage testing gas Gr also becomes higher. From these viewpoints, it is desirable that the leakage testing gas Gr filled in the hermetic container 520 be pressurized appropriately. It is desirable that the atmosphere of the leakage testing gas Gr filled in the hermetic container 520 be, for example, pressurized to about 0.1 MPa or higher, preferably about 0.2 MPa or higher relative to the atmospheric pressure. It is also desirable that the level of pressurization to the leakage testing gas Gr filled in the hermetic container 520 be, for example, up to about 0.5 MPa relative to the atmospheric pressure.

<<High-Concentration Filling 2: Provisional Filling>>

As the technique of increasing the concentration of the leakage testing gas Gr, it is also possible to depressurize the battery case 300 prepared in step A and fill (provisionally fill) the leakage testing gas Gr into the depressurized battery case 300, after the battery case preparing step (step A) and before the depressurizing step (step B).

Figure 6:
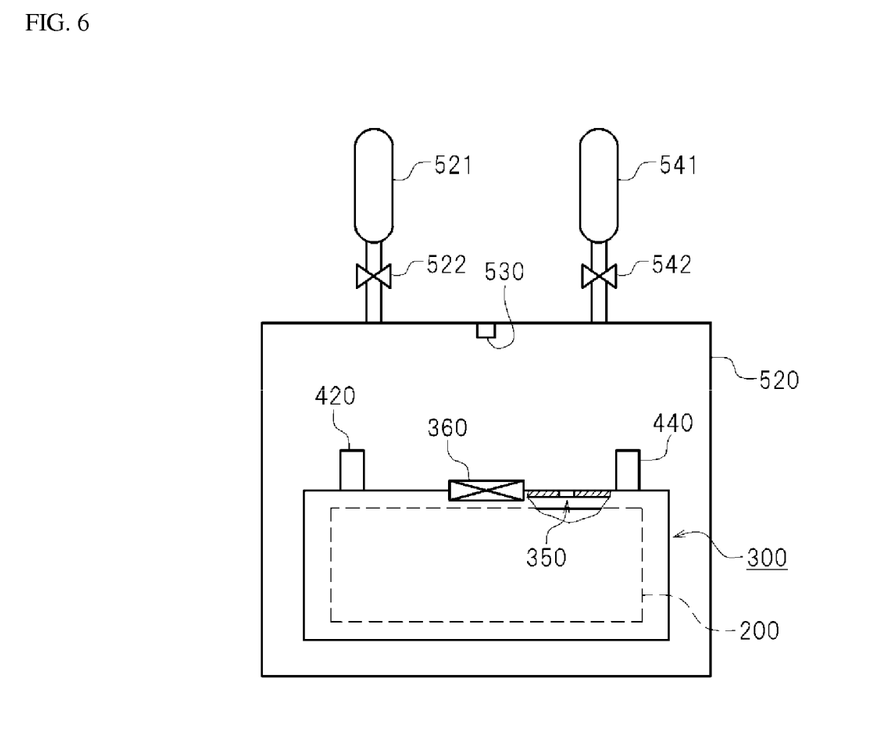
FIG. 6 is a view illustrating an example of a provisional filling step.

FIG. 6 is a view illustrating an example of such a provisional filling step. Such a provisional filling step is conducted as follows. As illustrated in FIG. 6, the battery case 300 prepared in step A is placed into the hermetic container 520 as it is, then the open-close valve 522 of the vacuum pump 521 is opened, and the interior of the hermetic container 520 is depressurized. At that time, because the electrolyte solution 354 is not contained in the hermetic container 520, the interior of the hermetic container 520 can be depressurized to a pressure lower than the vapor pressure of the electrolyte solution 354. By depressurizing the interior of the hermetic container 520 to a pressure lower than the vapor pressure of the electrolyte solution 354 (for example, to −100 kPa), the air and the moisture in the battery case 300 can be discharged in greater amounts, so the battery case 300 can be brought into such a condition that the amounts of the air and the moisture remaining in the battery case 300 are remarkably small. Moreover, in the provisional filling step, as the interior of the battery case 300 is depressurized to a lower pressure, the battery case 300 can be brought into such a condition that the amounts of the air and the moisture remaining in the battery case 300 are remarkably small. That is, in the provisional filling step, the interior of the hermetic container 520 can be depressurized to a pressure lower than that in the depressurizing step (step B), which is the following step.

In the provisional filling step, the open-close valve 522 of the vacuum pump 521 is closed after the just-described depressurization. Next, the open-close valve 542 of the vacuum pump 521 is opened, and the leakage testing gas Gr is introduced into the hermetic container 520. In this way, the leakage testing gas Gr can be provisionally filled into the battery case 300, and the atmosphere of the leakage testing gas Gr can be provided in the battery case 300 before the above-described depressurizing step (step B).

The depressurizing step (step B) thereafter may be performed as described above. For example, the pot containing the electrolyte solution 354 may be allowed to communicate with the filling port 350 of the battery case 300 in the hermetic container 520, and the interior of the hermetic container 520 may be depressurized by the vacuum pump 521. It should be noted that the electrolyte solution 354 exists in the hermetic container 520 in this case. Therefore, it is desirable that the interior of the hermetic container 520 be depressurized to such a level that the non-aqueous electrolyte solution 354 cannot be volatilized.

Thus, in the provisional filling step, the battery case 300 is depressurized in advance. At that time, because the electrolyte solution 354 is not placed in the hermetic container 520, the battery case 300 can be depressurized to a further lower pressure. The remaining air and moisture in the battery case 300 can be removed more effectively. In addition, in the provisional filling step, the battery case 300 is depressurized in advance and the leakage testing gas Gr is introduced therein before the depressurizing step (step B). In this case, the atmosphere of the leakage testing gas Gr is already provided in the battery case 300 before the depressurizing step (step B), so correspondingly, the concentration of the leakage testing gas Gr is higher in the battery that is sealed by undergoing step B to step D. As a result, the accuracy of the leakage test is increased.

Furthermore, even when such a provisional filling step is performed as well, it is possible that the leakage testing gas Gr may be pressurized and filled in the battery case 300 in the step of filling the electrolyte solution 354 and the leakage testing gas Gr into the battery case 300 (step C). This further increase the concentration of the leakage testing gas Gr in the battery, and further improves the accuracy of the leakage test.

<<High-Concentration Filling 3: Setting Aside, Infiltration, Refilling>>

It is also possible that, after step C and before the sealing step (step D), the battery case 300 may be set aside until the electrolyte solution 354 filled in the battery case 300 in step C sufficiently infiltrates in the electrode assembly 200. Thereafter, the interior of the battery case 300 may be depressurized and the leakage testing gas Gr may be filled again into the battery case 300 (refilling step). Here, the time for setting the battery case 300 aside until the electrolyte solution 354 sufficiently infiltrates in the electrode assembly 200 should desirably be 3 minutes or longer, for example, more preferably 5 minutes or longer, still more preferably 10 minutes or longer, and yet more preferably 15 minutes or longer. When the battery case 300 is set aside, the leakage testing gas Gr filled therein leaks through the filling port 350. In order to prevent the leakage testing gas Gr from leaking through the filling port 350, the filling port 350 may be provisionally sealed by, for example, affixing a film having hermeticity.

In this case, the interior of the battery case 300 is depressurized temporarily after setting the battery case 300 aside until the electrolyte solution 354 placed in the battery case 300 sufficiently infiltrates in the electrode assembly 200. This makes it possible to remove the gas that is produced while the electrolyte solution 354 infiltrates in the electrode assembly 200 within the battery case 300 (for example, the gas produced by the electrolyte solution 354 that evaporates in the battery case 300). Furthermore, the battery case 300 is depressurized in a condition in which the electrolyte solution 354 infiltrates in the electrode assembly 200 within the battery case 300, and thereafter, the leakage testing gas Gr is filled again into the battery case 300 (refilling step). Thus, the amount of the leakage testing gas Gr contained in the battery case 300 is increased by the refilling step after the electrolyte solution is infiltrated This further increase the concentration of the leakage testing gas Gr in the battery, and improves the accuracy of the leakage test.

In this case, it is also possible that the leakage testing gas Gr may be pressurized and filled in the battery case 300 in the refilling step, in other words, in the step of filling the leakage testing gas Gr again into the battery case 300. This further increase the concentration of the leakage testing gas Gr in the battery case 300, and further improves the accuracy of the leakage test.

Thus, various examples of the technique for sealing the leakage testing gas Gr into the battery case 300 have been illustrated. The present inventor evaluated the concentrations of the leakage testing gas Gr sealed in the battery case 300 according to the above-described various techniques.

<<Evaluation Test>>

Here, the present inventor prepared samples of the battery case 300 in which the wound electrode assembly 200 pressed in a flat shape was enclosed, for the prismatic battery as illustrated in FIG. 1. Using the prepared samples of the battery case 300, the electrolyte solution 354 and the leakage testing gas Gr were sealed into the battery case 300 according to the above-described various battery manufacturing methods, to construct batteries. Then, the concentration of the leakage testing gas Gr sealed in the battery case 300 was measured for each of the batteries.

In this evaluation test, it was determined that when the concentration of the leakage testing gas Gr sealed in the battery case 300 is higher, the battery manufacturing method adopted in constructing the battery is more advantageous in the leakage test. It should be noted that all the samples and the comparative example were made to be the same except for the technique for introducing the leakage testing gas Gr into the battery case 300. For example, the structure of the battery was common to all of them. Herein, a helium gas was used as the leakage testing gas Gr.

Comparative Example

A battery (Comparative Example) in which air, in place of the leakage testing gas Gr, was sealed in the battery case 300 was prepared for comparison with various battery manufacturing methods described above.

Here, as illustrated in FIG. 3, the pot 356 containing the electrolyte solution 354 is allowed to communicate with the filling port 350 of the battery case 300. The battery case 300 is placed in the hermetic container 520 while the pot 356 is open above the surface level of the electrolyte solution 354, and the hermetic container 520 is depressurized. Thereby, the battery case 300 is depressurized. Thereafter, the hermetic container 520 is released to atmospheric pressure, whereby the electrolyte solution 354 and the air are introduced into the battery case 300. Thus, the battery 100 (see FIG. 1) in which the air is sealed in the battery case 300 is prepared. Naturally, the amount of helium gas contained in the battery case 300 is little in the just-described battery 100.

In addition, when sealing the battery case 300, the procedure from taking the battery case 300 out of the hermetic container 520 until completing the sealing was set to be common, and the time for sealing the battery case 300 from the hermetic container 520 was set to 100 seconds.

<<Concentration of Enclosed Helium Gas>>

The concentration of the helium gas in the battery case 300 can be determined using a commercially available helium gas concentration analyzer (for example, HeliScent YHS-300 made by Yamaha Fine Technologies Co., Ltd.). Here, a through-hole was opened in the safety vent 360 of the battery 100 that was sealed, and the sensing head of the helium gas concentration analyzer was pressed against the through-hole quickly. The concentration of helium was measured in this manner.

<<Concentration of Helium Gas in Comparative Example>>

In the battery 100 in which the air is sealed in the battery case 300 as the comparative example, the concentration of helium gas was approximately 0.0005% (volume percentage).

<<Sample 1>>

Sample 1 was prepared as follows. As illustrated in FIG. 3, in the hermetic container 520, the pot 356 containing the electrolyte solution 354 is allowed to communicate with the filling port 350 of the battery case 300 after the cell drying step. Then, under this condition, the interior of the hermetic container 520 is depressurized, and thereafter, a helium gas atmosphere is provided in the hermetic container 520. Thereby, the electrolyte solution 354 and the helium gas were sealed in the battery case 300. In sample 1, the atmosphere of the hermetic container 520 when filling the electrolyte solution 354 into the battery case 300 is set to be a helium gas atmosphere having a pressure at approximately the same level as the atmospheric pressure. In other respects, sample 1 was fabricated under the same conditions as those in Comparative Example. In sample 1 described above, the concentration of the helium gas was about 13% (volume percentage). Thus, the above-described battery manufacturing method can significantly increase the concentration of the helium gas (leakage testing gas Gr) in the battery case 300.

<<Sample 2: High-Concentration Filling 1 (Pressure-Filling)>>

For sample 2, when a helium gas atmosphere was provided in the hermetic container 520, the helium gas was pressurized to 0.3 MPa relative to the atmospheric pressure. Thereby, the pressurized helium gas was sealed in the battery case 300. In other respects, the same conditions as those in sample 1 were employed. In sample 2 described above, the concentration of the helium gas was about 18% (volume percentage). Thus, the concentration of the helium gas in the battery case 300 can be further increased by pressurizing the helium gas (leakage testing gas Gr) and filling it into the hermetic container 520 in the step of filling the electrolyte solution 354.

<<Sample 3: High-Concentration Filling 2 (Provisional Filling)>>

Sample 3 was prepared as follows. After the battery case preparing step (step A) including the cell drying step and before the depressurizing step (step B), the interior of the battery case 300 prepared in step A was depressurized, and the leakage testing gas Gr was filled (provisionally filled) into the depressurized battery case 300. Here, in the provisional filling step, the interior of the hermetic container 520 was depressurized to −100 kPa relative to the atmospheric pressure, as illustrated in FIG. 5, when depressurizing the interior of the battery case 300 prepared in step A. Thereafter, the pressure of the helium gas atmosphere in the hermetic container 520 was set to be approximately the same level as the atmospheric pressure, and the helium gas was filled into the battery case 300.

Then, as in sample 1, the pot 356 containing the electrolyte solution 354 is allowed to communicate with the filling port 350 of the battery case 300 in the hermetic container 520. Then, under this condition, the interior of the hermetic container 520 is depressurized, and thereafter, the interior of the hermetic container 520 is made to be the helium gas atmosphere with the same level of pressure as the atmospheric pressure. Thereby, the electrolyte solution 354 and the helium gas were sealed in the battery case 300.

In other respects, sample 3 was fabricated under substantially the same conditions as those in sample 1, except that the above-described provisional filling step was provided. In sample 3 described above, the concentration of the helium gas was about 22% (volume percentage). Thus, by additionally providing the above-described provisional filling step, the concentration of the helium gas in the battery case 300 can be further increased because the atmosphere in the battery case 300 is replaced with the helium gas.

<<Sample 4: High-Concentration Filling 3 (Setting Aside, Infiltration, Refilling)>>

Sample 4 was prepared as follows. The electrolyte solution 354 and the helium gas were filled into the battery case 300 under the same conditions as those in sample 1 (see FIG. 3). Thereafter, the battery case 300 was set aside for about 3 minutes to about 15 minutes (10 minutes herein). Furthermore, the hermetic container 520 was depressurized to −90 kPa relative to the atmospheric pressure, to thereby depressurize the battery case 300. Then, the interior of the hermetic container 520 was made to be the helium gas atmosphere with approximately the same level of pressure as the atmospheric pressure, and the helium gas was filled into the battery case 300 at approximately the same level of pressure as the atmospheric pressure.

This sample 4 is different from sample 1 in the respect that the refilling step is additionally provided, in which the battery case 300 is set aside after filling the electrolyte solution 354 and thereafter depressurized, and the helium gas is again filled therein. In sample 4 described above, the concentration of the helium gas was about 25% (volume percentage). Thus, by additionally providing the refilling step, the concentration of the helium gas in the battery case 300 can be further increased.

As described above, all the above-described embodiments of the battery manufacturing method can increase the concentration of the helium gas (leakage testing gas Gr) in the battery case 300. With the above-described battery manufacturing method, the longer the time it takes from the electrolyte filling to the sealing, the more the helium gas, which is lighter than the atmosphere, tends to escape from the battery case 300. It is expected that the time required from the electrolyte filling to the sealing can be longer in the actual mass production line than that in the laboratory. In this case, it is desirable that the concentration of the leakage testing gas Gr in the battery case 300 be kept approximately to a level necessary for the leakage test even when the time required from the electrolyte filling to the sealing is long, for example, about 5 minutes.

The above-described battery manufacturing method can keep the concentration of the helium gas to 5% (volume percentage) or higher in the battery case 300, so it can keep the concentration of the leakage testing gas Gr necessary for the leakage test even when the time required from the electrolyte filling to the sealing is long, for example, about 5 minutes. It should be noted that such a guideline can vary depending on the size of the filling port 350, the type of the leakage testing gas Gr, and the like. The time required from the electrolyte filling to the sealing should preferably be as short as possible. Moreover, because the leakage testing gas Gr leaks from the battery case 300 during the time from the electrolyte filling to the sealing, the battery manufacturing method that can fill the leakage testing gas Gr into the battery case 300 at a higher concentration is more desirable in order to improve the accuracy of the leakage test.

A battery that is manufactured in the above-described battery manufacturing method comprises, for example, the hermetically sealed-type battery case 300, the electrode assembly 200 enclosed in the battery case 300, and the electrolyte solution 354 filled in the battery case 300. For example, as the battery with such a configuration, it is possible to construct a high-power battery, such as a lithium-ion secondary battery. In such a high-power battery, a high voltage is produced during charge and discharge. For this reason, if moisture remains in the battery, the water may undergo electrolysis, generating hydrogen gas.

As described above, with this battery manufacturing method, the moisture in the battery case 300 is removed in the cell drying step and the depressurizing step (step B), and thereafter, the electrolyte solution 354 and the leakage testing gas Gr are filled into the battery case 300 without being exposed to the atmosphere. Further, thereafter, it is desirable to seal the filling port 350 while managing the dew point. This makes it possible to set the moisture content contained in the battery case 300 to be remarkably low.

That is, the battery manufactured by this battery manufacturing method not only obtains a high concentration of the leakage testing gas Gr in the gas atmosphere within the battery case 300 but also, for example, can keep a remarkably low concentration of the hydrogen gas in the battery case 300. This makes it possible to construct a battery in which the concentration of the leakage testing gas Gr is high and the concentration of the hydrogen gas is remarkably low in the gas atmosphere within the battery case 300. For example, it is possible to provide a battery in which the leakage testing gas Gr is 3% (volume percentage) or more, more preferably 5% (volume percentage) or more, while the hydrogen gas is 0.5% (volume percentage) or less, more preferably 0.1% (volume percentage) or less, in the gas atmosphere within the battery case 300. Moreover, the generation of hydrogen gas can be kept low, 0.05% or less (volume percentage). Particularly when the above-described cell drying step is provided, the generation of hydrogen gas can be kept significantly low. In this case, it is desirable to use a helium gas, which is an inert gas, as the leakage testing gas Gr. The use of a helium gas as the leakage testing gas Gr can stabilize the battery reactions and can therefore contribute to keeping the battery performance over time.

Hereinabove, examples of the battery manufacturing method and the leakage testing method according to one embodiment of the present invention have been described. However, the present invention is not limited to the embodiment described above.

Figure 7:
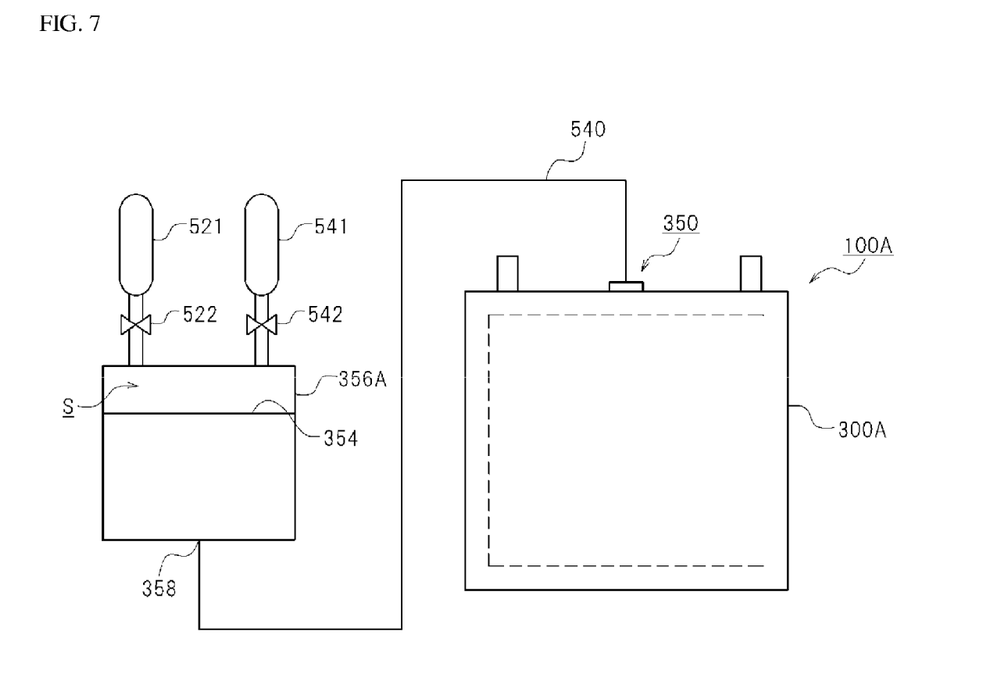
FIG. 7 is a view illustrating another embodiment of the battery manufacturing method.

For example, the shape of the battery case 300 is not limited to a rectangular shape, but may be other shapes, such as a cylindrical shape. In addition, as illustrated in FIG. 7, a laminate-type battery 100A in which its battery case 300A is constructed by a laminate film may be employed, for example. Moreover, the electrode assembly 200 is not limited to the wound electrode assembly. For example, it is possible to use a stack-type electrode assembly in which positive electrode sheets 220 and negative electrode sheets 240 are alternately stacked on each other with separators interposed therebetween. Examples of the battery 100 to which the above-mentioned battery manufacturing method can be applied include various types of secondary batteries, such as lithium-ion secondary batteries.

In the foregoing embodiments, the step of filling the electrolyte solution 354 is conducted in the hermetic container 520. The battery manufacturing method proposed herein may not necessarily use the hermetic container 520.

For example, as illustrated in FIG. 7, the battery case 300A is constructed by a laminate film in the laminate-type battery 100A. In this case, a filling port 350A for filling the electrolyte solution 354 into the battery case 300A is provided in the battery case 300A. In addition, a pot 356A containing the electrolyte solution 354, a vacuum pump 521 connected to an upper space S that is above the electrolyte solution 354 in the pot 356A, and the tank 541 also connected to the upper space S in the pot 356A are prepared. The filling port 350 of the battery case 300A is connected to a flow hole 358 provided in the bottom portion of the pot 356A by a hermetic pipe 540. At that time, the electrolyte solution 354 in the pot 356A is disposed at a lower position than the battery case 300A. In this case, a container having hermeticity should be employed for the pot 356A.

In this case, in step B of depressurizing the battery case 300A prepared in step A, the open-close valve 522 of the vacuum pump 521 is opened to discharge the air in the battery case 300A. In this case, the air in the battery case 300A is discharged through the pipe 540 and the pot 356A. When the pressure is lowered to an appropriate level in the depressurizing step (step B), the open-close valve 522 of the vacuum pump 521 is closed. Next, in step C of filling the electrolyte solution 354 and the leakage testing gas Gr into the depressurized battery case 300A, the open-close valve 542 of the tank 541 for the leakage testing gas Gr is opened, and the leakage testing gas Gr is supplied to the upper space of the pot 356A. At that time, the electrolyte solution 354 passes through the pipe 540 and flows into the battery case 300A through the filling port 350 because of the pressure difference between the upper space S in the pot 356A and the space in the depressurized battery case 300A. Furthermore, as the electrolyte solution 354 is filled, the leakage testing gas Gr is also supplied into the battery case 300A.

Thus, the battery manufacturing method proposed herein is also applicable to laminate-type batteries, and it does not necessarily require the hermetic container 520. The battery manufacturing method proposed herein is not limited to the embodiments described above, and various modifications are possible.

REFERENCE SIGNS LIST 100, 100A—Battery
200—Wound electrode assembly
200—Electrode assembly
220—Positive electrode sheet
222—Uncoated portion
223—Positive electrode active material layer
240—Negative electrode sheet
242—Uncoated portion
243—Negative electrode active material layer
262—Separator
300, 300A—Battery case
320—Case main body
340—Lid
350, 350A—Filling port
352—Sealing cap
354—Electrolyte solution (Non-aqueous electrolyte solution)
356, 356A—Pot
358—Flow hole
360—Safety vent
420—Electrode terminal
440—Electrode terminal
510—Drying oven
521—Hermetic container
521—Vacuum pump
522—Open-close valve
530—Sensor
540—Pipe
541—Tank
542—Open-close valve
Gr—Leakage testing gas
S—Upper space

The invention claimed is:

1. A method of manufacturing a battery, comprising the steps of:
   A) preparing a battery case in which an electrode assembly is enclosed;
   B) depressurizing an interior of the battery case;
   C) filling an electrolyte solution and the leakage testing gas into the battery case depressurized in step B; and
   D) sealing the battery case containing the electrolyte solution and the leakage testing gas filled in step C,
   after step A and before step B, the step of provisionally filling a leakage testing gas in the battery case by depressurizing the interior of the battery case prepared in step A to a pressure lower than the atmospheric pressure and filling the leakage testing gas into the depressurized battery case.

2. The method according to claim 1, wherein, in step C, the electrolyte solution is filled into the battery case depressurized in step B while an atmosphere of the leakage testing gas is provided outside the battery case.

3. The method according to claim 1, wherein step A further comprising a cell drying step of drying an interior of the battery case in which the electrode assembly is enclosed.

4. The method according to claim 1, wherein at least the step B and the step C are performed while the battery case is placed in a hermetic container having hermeticity.

5. The method according to claim 4, wherein:
   step B further comprises the step of depressurizing the hermetic container by placing a pot containing the electrolyte solution so as to allow the pot to communicate with a filling port of the battery case and opening the pot above a surface level of the electrolyte solution; and
   in step C, the interior of the hermetic container is filled with the leakage testing gas atmosphere.

6. The method according to claim 1, wherein the electrolyte solution is a non-aqueous electrolyte solution.

7. The method according to claim 1, wherein in the step of provisionally filling, the battery case prepared in step A is depressurized to a pressure lower than a vapor pressure of the electrolyte solution.

8. The method according to claim 1, wherein in step C, the leakage testing gas is pressurized to fill the leakage testing gas into the battery case.

9. The method according to claim 1, further comprising:
   after step C and before step D, the step of refilling the leakage testing gas by depressurizing the interior of the battery case and filling the leakage testing gas into the depressurized battery case.

10. The method according to claim 9, wherein, after step C, the battery case is set aside for at least 3 minutes before depressurizing the interior of the battery case in the step of refilling.

11. The method according to claim 9, wherein:
    after step C and before step D, in the step of refilling, the leakage testing gas is pressurized when being filled into the battery case.

12. The method according to claim 1, wherein the leakage testing gas is helium gas.

13. The method according to claim 1, further comprising:
    E) checking whether or not the leakage testing gas leaks out of the battery case sealed in step D.

14. A battery leakage testing method comprising the steps of:

A) preparing a battery case in which an electrode assembly is enclosed;
B) depressurizing an interior of the battery case;
C) filling an electrolyte solution and the leakage testing gas into the battery case depressurized in the step B;
D) sealing the battery case containing the electrolyte solution and the leakage testing gas filled in step C; and
E) checking whether or not the leakage testing gas leaks out of the battery case sealed in the step D,
after step A and before step B, the step of provisionally filling the leakage testing gas in the battery case by depressurizing the interior of the battery case prepared in step A to a pressure lower than the atmospheric pressure and filling the leakage testing gas into the depressurized battery case.

15. A method of manufacturing a battery, comprising the steps of:
A) preparing a battery case in which an electrode assembly is enclosed;
B) depressurizing an interior of the battery case prepared in step A;
C) filling an electrolyte solution and a leakage testing gas into the battery case depressurized in step B; and
D) sealing the battery case containing the electrolyte solution and the leakage testing gas filled in step C,
wherein at least the step B and the step C are performed while the battery case is placed in a hermetic container having hermeticity,
step B further comprises the step of depressurizing the hermetic container by placing a pot containing the electrolyte solution so as to allow the pot to communicate with a filling port of the battery case and opening the pot above a surface level of the electrolyte solution; and
in step C, the interior of the hermetic container is filled with the leakage testing gas atmosphere.

16. A method of manufacturing a battery, comprising the steps of:
A) preparing a battery case in which an electrode assembly is enclosed;
B) depressurizing an interior of the battery case prepared in step A;
C) filling an electrolyte solution and a leakage testing gas into the battery case depressurized in step B; and
D) sealing the battery case containing the electrolyte solution and the leakage testing gas filled in step C,
wherein, after step C and before step D, the step of refilling the leakage testing gas by depressurizing the interior of the battery case and filling the leakage testing gas into the depressurized battery case.

17. The method of manufacturing a battery according to claim 16, wherein, after step C, the battery case is set aside for at least 3 minutes before depressurizing the interior of the battery case in the step of refilling.

18. The method according to claim 16, wherein, after step C and before step D, in the step of refilling, the leakage testing gas is pressurized when being filled into the battery case.

* * * * *